(12) United States Patent
Argyris et al.

(10) Patent No.: US 11,711,147 B2
(45) Date of Patent: Jul. 25, 2023

(54) SYSTEMS, DEVICES, AND METHODS FOR TUNING TRANSCEIVERS

(71) Applicant: MELLANOX TECHNOLOGIES, LTD., Yokneam (IL)

(72) Inventors: Nikolaos (Nikos) Argyris, Zografou (GR); Yoav Rosenberg, Haifa (IL); Dimitrios Kalavrouziotis, Papagou (GR); Paraskevas Bakopoulos, Ilion (GR); Elad Mentovich, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 117 days.

(21) Appl. No.: 17/326,770

(22) Filed: May 21, 2021

(65) Prior Publication Data
US 2022/0329322 A1  Oct. 13, 2022

(30) Foreign Application Priority Data
Apr. 12, 2021 (GR) .............................. 20210100252

(51) Int. Cl.
| | |
|---|---|
| *H04B 10/40* | (2013.01) |
| *H04B 10/61* | (2013.01) |
| *H04B 10/112* | (2013.01) |
| *H04B 10/50* | (2013.01) |

(52) U.S. Cl.
CPC ......... *H04B 10/40* (2013.01); *H04B 10/1127* (2013.01); *H04B 10/503* (2013.01); *H04B 10/613* (2013.01)

(58) Field of Classification Search
CPC .. H04B 10/40; H04B 10/503; H04B 10/1127; H04B 10/613

USPC .......................................................... 398/135
See application file for complete search history.

(56) References Cited

U.S. PATENT DOCUMENTS

| | | | | | |
|---|---|---|---|---|---|
| 5,347,601 | A | * | 9/1994 | Ade ........................ | H04B 10/40 398/139 |
| 7,215,891 | B1 | * | 5/2007 | Chiang .................. | H04B 10/40 398/195 |
| 7,877,016 | B2 | * | 1/2011 | Nagarajan ............... | H04J 14/02 398/67 |
| 8,543,010 | B2 | * | 9/2013 | Zhou ................. | H04B 10/50575 398/198 |
| 9,325,419 | B1 | * | 4/2016 | Kato ..................... | H04B 10/506 |
| 9,407,361 | B1 | * | 8/2016 | Zhang .................. | H04B 10/541 |
| 9,998,232 | B2 | * | 6/2018 | Yue ........................ | H04B 10/516 |
| 10,732,029 | B2 | * | 8/2020 | Stone ................. | G01R 31/3187 |

(Continued)

OTHER PUBLICATIONS

Kim et al; Design and Implementation Scheme of QSFP28 Optical Transceiver for Long-Reach Transmission Using PAM4 Modulation; Mar. 2021; Applied Sciences; pp. 1-19. (Year: 2021).*

*Primary Examiner* — Amritbir K Sandhu
(74) *Attorney, Agent, or Firm* — Sheridan Ross P.C.

(57) ABSTRACT

A transceiver comprises a transmitter including a light source, a modulator coupled to the light source, a driver that drives the modulator according to a set of driving conditions to cause the modulator to output optical signals based on light from the light source, and an output that passes first portions of the optical signals output by the modulator. The transceiver further comprises a first detector that detects second portions of the optical signals output from the modulator, and a receiver including a second detector that detects optical signals from an external transmitter.

20 Claims, 9 Drawing Sheets

(56) References Cited

U.S. PATENT DOCUMENTS

| | | | |
|---|---|---|---|
| 11,070,288 B1* | 7/2021 | Guzzon | H04B 10/40 |
| 2005/0122154 A1* | 6/2005 | Lee | H03K 19/01759 |
| | | | 327/333 |
| 2009/0196631 A1* | 8/2009 | Daghighian | H01L 31/105 |
| | | | 372/50.21 |
| 2018/0026717 A1* | 1/2018 | Ray | H04B 10/69 |
| | | | 398/25 |
| 2018/0069633 A1* | 3/2018 | Onaka | H04B 10/672 |
| 2018/0109317 A1* | 4/2018 | King | H04Q 11/0062 |
| 2018/0267257 A1* | 9/2018 | Aboulhouda | H01S 5/042 |
| 2019/0097728 A1* | 3/2019 | Frankel | H04B 10/505 |
| 2019/0196631 A1* | 6/2019 | Li | G06F 3/0412 |

* cited by examiner

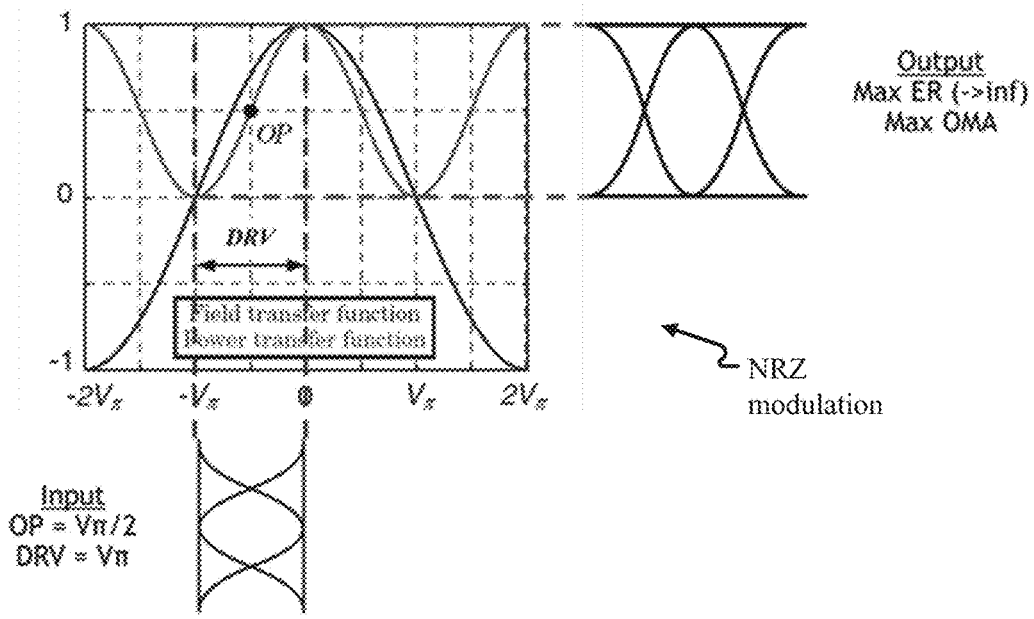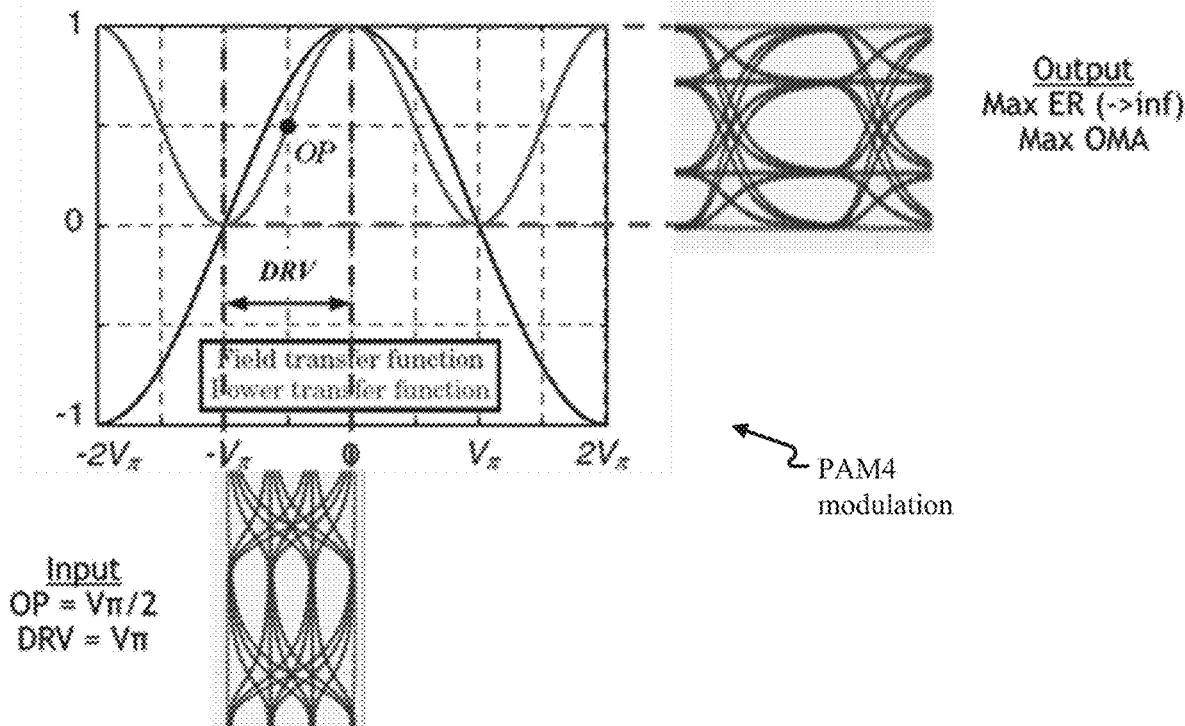
Fig. 3B

LUT for Tx1

| Driving conditions for Tx1 | Performance metrics from TS1 | Modulator characteristics from TS2 |
|---|---|---|
| Bias[1], Swing[1], Pwr[1] | SNR[1], BER[1], Jitter[1], RSSI[1], Ch[1] | Imbalance[1], Linearity[1], OP[1] |
| ⋮ | ⋮ | ⋮ |
| Bias[N], Swing[N], Pwr[N] | SNR[N], BER[N], Jitter[N], RSSI[N], Ch[N] | Imbalance[N], Linearity[N], OP[N] |

LUT for Tx2

| Driving conditions for Tx2 | Performance metrics from TS3 | Modulator characteristics from TS4 |
|---|---|---|
| Bias[1], Swing[1], Pwr[1] | SNR[1], BER[1], Jitter[1], RSSI[1], Ch[1] | Imbalance[1], Linearity[1], OP[1] |
| ⋮ | ⋮ | ⋮ |
| Bias[N], Swing[N], Pwr[N] | SNR[N], BER[N], Jitter[N], RSSI[N], Ch[N] | Imbalance[N], Linearity[N], OP[N] |

*Fig. 5*

SYSTEMS, DEVICES, AND METHODS FOR TUNING TRANSCEIVERS

FIELD OF THE DISCLOSURE

The present disclosure is generally directed to systems, devices, and methods for tuning transceivers.

BACKGROUND

Optical fiber networks offer fast and generally reliable data transmission between devices. In these networks, optical transceivers are often employed to send and/or receive light signals modulated with data. The quality and/or speed of data transmission may depend on driving conditions of a transmitter of a transceiver and/or channel conditions of the transmission path.

BRIEF SUMMARY

In an illustrative embodiment, a transceiver comprises a transmitter including a light source, a modulator coupled to the light source, a driver that drives the modulator according to a set of driving conditions to cause the modulator to output optical signals based on light from the light source, and an output that passes first portions of the optical signals output by the modulator. The transceiver further comprises a first detector that detects second portions of the optical signals output from the modulator, and a receiver including a second detector that detects optical signals from an external transmitter.

In an illustrative embodiment, a device comprises a transmitter, a first detector, a second detector, and processing circuitry that drives the transmitter with different sets of driving conditions, determines, for each set of driving conditions, corresponding performance metrics of the transmitter based on output of the first detector and based on output of the second detector, stores the sets of driving conditions and the corresponding performance metrics for each set of driving conditions, selects a set of driving conditions from the stored sets of driving conditions based on data transmission metrics, and causes the transmitter to transmit data according to the selected set of driving conditions.

In an illustrative embodiment, a device comprises a transmitter and processing circuitry that accesses, in response to a request to transmit data, a memory including stored associations that associate sets of driving conditions for the transmitter with corresponding sets of performance metrics achieved by driving the transmitter with the sets of driving conditions, selects a set of driving conditions from the sets of driving conditions based on data transmission metrics, and causes the transmitter to transmit the data according to the selected set of driving conditions.

Additional features and advantages are described herein and will be apparent from the following Description and the figures.

BRIEF DESCRIPTION OF THE SEVERAL VIEWS OF THE DRAWINGS

FIG. 3B illustrates transfer functions for the modulator in FIG. 3A according to at least one example embodiment;

FIG. 5 illustrates look-up-tables according to at least one example embodiment.

DETAILED DESCRIPTION

Figure 1:
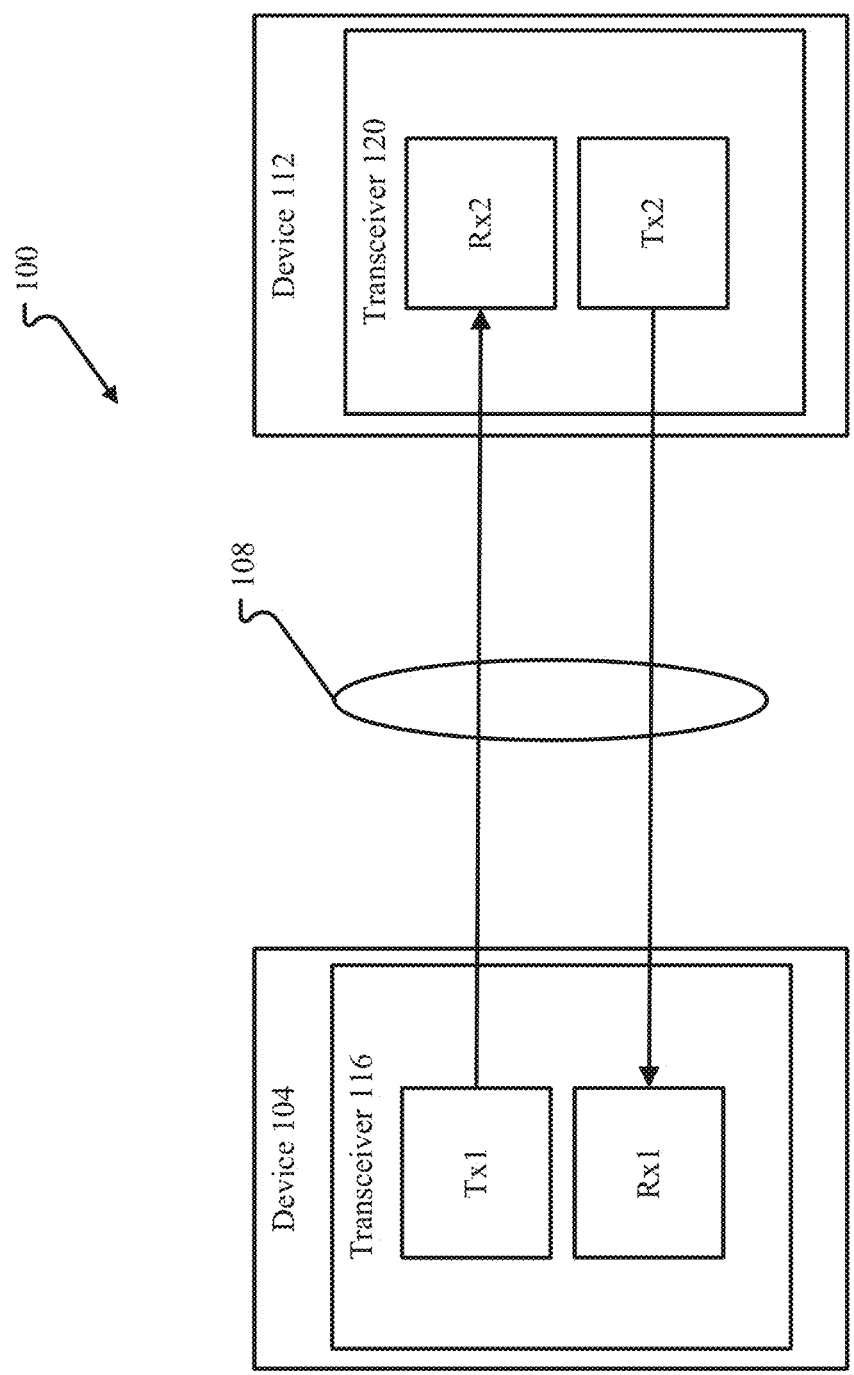
FIG. 1 illustrates a system according to at least one example embodiment.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The terms "determine," "calculate," and "compute," and variations thereof, as used herein, are used interchangeably and include any appropriate type of methodology, process, operation, or technique.

Various aspects of the present disclosure will be described herein with reference to drawings that may be schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "including," "includes,"

"comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Inventive concepts propose a scheme for adaptive transmission performance optimization of a transceiver module by adjusting the transmitter driving characteristics. The optimization mechanism relies on performance metrics and measurements acquired from the transmitter and receiver subsystems of the transceiver module. This approach allows for optimization of power consumption and link margins (in terms of SNR, optical power, etc.) over a point-to-point connection. The power consumption metric is correlated to the driving power of the electronic driving IC of the electro-optical modulator. Although embodiments are discussed with reference to a Mach-Zehnder Modulator (MZM)-based optical transmitter as a reference, inventive concepts may be applied to various externally modulated transmitters (EMLs, Ring modulators) and directly modulated optical transmitter (VCSEL or DMLs) with minor modifications to account for the transfer functions of the different modulators.

Figure 2:
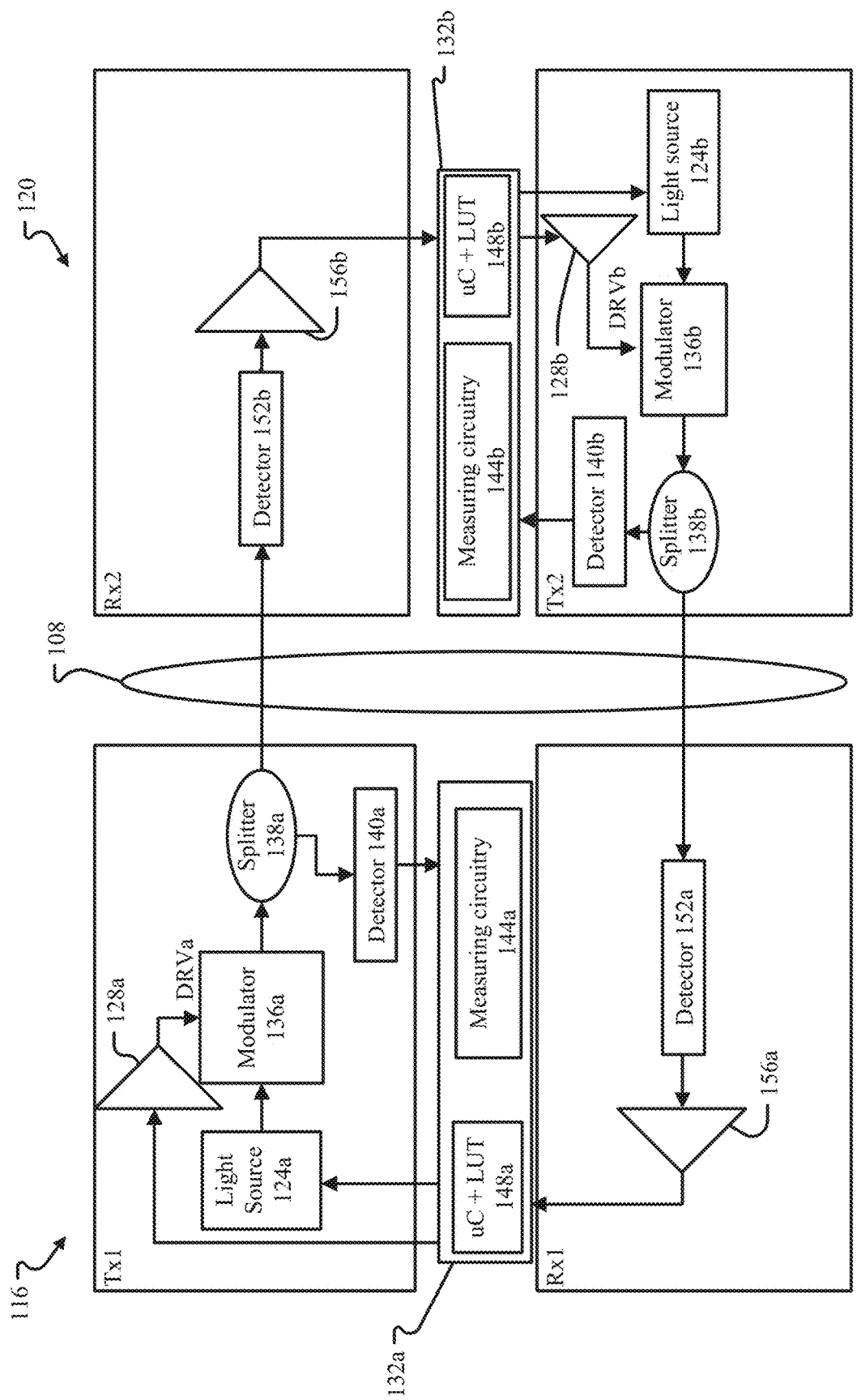
FIG. 2 illustrates example structures for the transceivers from FIG. 1 according to at least one example embodiment.

Consider an optical link with two pluggable transceiver modules in bidirectional connection (see FIG. 2). The electro-optical links include Tx1-fiber-Rx2, and Tx2-fiber-Rx1. Each link may be optimized in terms of performance (e.g., low BER, high signal integrity metrics) by tuning of driving conditions of the transmitters Tx1 and Tx2. Tuning of these driving conditions depends on the characteristics the electro-optical components which are included in the transceiver modules. These characteristics may differ from the nominal values specified during the manufacturing of the transceiver modules, which may contribute to degraded performance of the optical links.

In one example, driving optimization of a Mach-Zehnder modulator used in an optical transmitter module may be performed by the proper selection of bias voltage and voltage swing applied to the electrodes of the modulator.

In principle, the Mach-Zehnder modulator (and similar modulators) is defined by its modulation transfer function (see FIG. 3B). For best performance, the MZM, which may implement modulation schemes such as NRZ and/or PAM4, should be operated at an operating point OP. This is achieved by tuning the bias voltage applied to electrodes of the modulator. The swing (e.g., voltage swing) of the driving signal DRV around operating point OP determines the optical modulation of the signal output from the modulator as well as other signal integrity parameters such as, level imbalance or linearity in case of PAM-4. The optimum values for the operating point OP and voltage swing are related to the intrinsic characteristics of the modulator (manufacturing mismatches compared to the original design) and to the optical link and the receiver performance of the module to which the transmitter under optimization is connected.

In one configuration, the modulator has a segmented architecture. In this case the modulator's effective length is split into small segments and each segment can be driven by a binary or multi-level signal (see FIG. 3A). Each segment is driven by a separate driver circuit, and each segment therefore contributes partially to the overall transfer function of the modulator. In this configuration, adjusting the optical modulation level is achieved by controlling the on/off states of the driver circuits in each segment.

Inventive concepts generally cover three stages: an initialization stage, a setup stage, and an operation stage.

Consider an example with two transceivers: transceiver A with a transmitter A and receiver A; and transceiver B with transmitter B and receiver B. In the initialization stage, the transmitter and receiver of each transceiver module are set to the nominal values of operation, which may include setting the electrical ICs of a transceiver (e.g., driver(s) and transimpedance amplifiers (TIAs)) and the optical components of the transceiver (e.g., the modulator and photodetector(s)). The initialization process begins with transmitter A of transceiver A transmitting a first known signal (e.g., a first training sequence) to receiver B of transceiver B. Transceiver B, after receiving and decoding the first training sequence to recover data and without performing any post-detection functions (e.g., error correction or similar functions) feeds the recovered data as input to transmitter B to generate a version of the first training sequence that is based on the recovered data. Transmitter B (which may be operating in default settings regarding modulator voltage swing and bias voltage conditions) transmits this version of the training sequence to receiver A of transceiver A. Receiver A detects the signal a microprocessor of transceiver A acquires system state parameters or signal characteristics from the detected signal. One system state parameter or signal characteristic may include a Receiver Signal Strength Indicator (RSSI).

The initialization process continues with transmitter A transmitting a second known signal (e.g., a second training sequence) that is directly detected by a monitor photodiode that feeds a local power meter. The output of the power meter is fed to the microprocessor and analyzed to determine characteristics of the modulator.

After receiving the inputs from the TIA and the local power meter, the microprocessor (which is capable of generating and checking the first and second training sequences) matches the measurements from receiver A, the local photodiode, and the computed performance metrics of the link (e.g., BER, jitter, SNR, RSSI, optical channel impairments, and/or the like) with the driving state of the modulator of Tx1. The, a first entry in a look up table (LUT), which may be in the microcontroller's memory, is created.

The same initialization procedure is repeated for various settings of modulator bias voltages and voltage swings and, for each case, a new entry in the LUT is created. At this point, a full LUT has been created for transmitter A. Then, the same initialization procedure is repeated for transmitter B in order to create a similar LUT for transmitter B.

Now, both transceiver modules A and B have concluded the mappings of driver status (modulator voltage swing and bias voltage) to the link performance. Then the link is ready to be up and running. The values of the Tx drivers for both modules are set to the optimum values using the LUT entries in terms of performance metrics (minimum BER, jitter, maximum SNR, etc.). If several driving values correspond to the best transmission metrics, then the minimum voltage swing is selected to minimize the power consumption of both transmitters A and B.

With the link in operation, the measurements described in the initialization stage are periodically repeated in order to identify whether the link is operating at its optimum conditions and minimum power consumption settings. In other words, the LUT entries can correlate the current state of the transceivers A and B and the performance of the link. In case the link performance deteriorates (e.g., increased optical losses) and the microcontroller cannot correlate the measurements with the performance metrics in the LUT entries, a new initialization stage may be triggered.

As may be appreciated from the preceding and following descriptions, inventive concepts propose to improve transceiver performance by accounting for manufacturing inconsistencies in transceiver components and dynamic changes over an optical link.

FIG. 1 illustrates a system 100 according to at least one example embodiment. The system 100 includes a device 104, a communication network 108, and a device 112. In at least one example embodiment, devices 104 and 112 correspond to one or more of a Personal Computer (PC), a laptop, a tablet, a smartphone, a server, a collection of servers, or the like. In some embodiments, the devices 104 and 112 may correspond to any appropriate type of device that communicates with other devices also connected to a common type of communication network 108. As another specific but non-limiting example, the devices 104 and 112 may correspond to servers offering information resources, services and/or applications to user devices, client devices, or other hosts in the system 100.

Examples of the communication network 108 that may be used to connect the devices 104 and 112 include an Internet Protocol (IP) network, an Ethernet network, an InfiniBand (TB) network, a Fibre Channel network, the Internet, a cellular communication network, a wireless communication network, combinations thereof (e.g., Fibre Channel over Ethernet), variants thereof, and/or the like. In one specific, but non-limiting example, the communication network 108 is a network that enables data transmission between the devices 104 and 112 using optical signals. In this case, the devices 104 and 112 and the communication network 108 may include waveguides (e.g., optical fibers) that carry the optical signals. As discussed in more detail below, example embodiments relate to improving or optimizing data transfer within the system 100.

The device 104 includes a transceiver 116 for sending and receiving signals, for example, optical signals. The signals may be modulated with data. As shown, transceiver 116 includes a transmitter Tx1 and a receiver Rx1. The structure of the transceiver 116 is described in more detail below with reference to FIG. 2.

The device 112 may include a transceiver 120 for sending and receiving signals modulated with data. The transceiver 120 includes a transmitter Tx2 and a receiver Rx2. In at least one embodiment, the transceiver 116 is coupled to the transceiver 120 over the communication network 108. For example, the transmitter Tx1 of transceiver 116 is coupled to receiver Rx2 of transceiver 120 and the transmitter Tx2 of transceiver 120 is coupled to receiver Rx1 of transceiver 116 which enables the devices 104 and 112 to exchange data.

Although not explicitly shown, it should be appreciated that devices 104 and 112 may include other processing devices, storage devices, and/or communication interfaces generally associated with computing tasks, such as sending and receiving data.

FIG. 2 illustrates example structures for the transceivers 116 and 120 from FIG. 1 according to at least one example embodiment.

The transceiver 116 includes the transmitter Tx1, the receiver Rx1, and processing circuitry 132a. Although the processing circuitry 132a is shown as being separate from the transmitter Tx1 and receiver Rx1, it should be appreciated that the processing circuitry 132a may be included in the transmitter Tx1 and/or the receiver Rx1 if desired.

The transmitter Tx1 of the transceiver 116 includes a light source 124a, a driver 128a, a modulator 136a, a splitter 138a, and a detector 140a, while the receiver Rx1 of the transceiver 116 may include a detector 152a and amplification circuitry 156a.

The light source 124a may include a light emitting device, such as a diode laser or an array of diode lasers, for generating optical signals. In an embodiment according to FIG. 2, the light source 124a may emit continuous (i.e., not varying) light, and light modulation may carried out by the modulator 136a. The modulator 136a may be a Mach-Zender modulator (MZM), a Franz-Keldysh modulator, a micro-ring modulator, or the like. Alternatively, the processing circuitry 132a may directly control the light source 124a to emit modulated light without using the modulator 136a.

The driver 128a may include appropriate driving circuitry for driving the modulator 136a under control of the processing circuitry 132a to output a driving signal DRVa having a particular voltage swing (e.g., a desired peak-to-peak voltage) and a particular bias voltage that is applied to electrodes of the modulator 136a. The driver 128a may include amplification circuitry so that the driving signal DRVa is an amplified signal compared to the signal input to the driver 128a.

The processing circuitry 132a may comprise software, hardware, or a combination thereof. For example, the processing circuitry 132a may include a memory including executable instructions and a processor (e.g., a microprocessor or microcontroller) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 132a may comprise hardware, such as an application specific integrated circuit (ASIC). Other non-limiting examples of the processing circuitry 132a include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 132a may be provided on a Printed Circuit Board (PCB) or collection of PCBs. It should be appreciated that any appropriate type of electrical component or collection of electrical components may be suitable for inclusion in the processing circuitry 132a. The processing circuitry 132a may send and/or receive signals to and/or from other elements of the transceiver 116 to control overall operation of the transceiver 116.

In an embodiment according to FIG. 2, the processing circuitry 132a includes measuring circuitry 144a and a microcontroller (uC) 148a. The measuring circuitry 144a may include hardware and/or software for measuring one or more characteristics of the signal output from the detector 140a. For example, the measuring circuitry 144a may include a signal power meter that senses optical power of the signal input to the detector 140a. The microcontroller 148a has processing capabilities and may include memory that stores a look-up-table (LUT). The LUT and functions of the processing circuitry 132a will be described in more detail below with reference to FIGS. 3A-6.

The splitter 138a may include a beam splitter that directs a first portion of modulated light output from the modulator 136a toward the detector 140a and directs a second portion of the modulated light output from the modulator 136a to the communication network 108 through an output of the transmitter Tx1. For example, the splitter 138a may comprise a prism or multiple prisms to direct light in the manner described above. In at least one embodiment the splitter 138a is constructed to direct about 10% of light output from the modulator 136a to the detector 140a and direct remaining light (about 90%) to the output of the transmitter Tx1 connected to the communication network 108. However, example embodiments are not limited thereto and the amount of light directed by the splitter 138a may be adjusted according to design preferences.

The detector 140a may include an optical detector for detecting an optical signal. For example, the detector 140a includes one or more photodiodes (e.g., an array of photodiodes) or other photosensors (e.g., phototransistors, avalanche diodes, and/or the like) that detect light output from the splitter 138a. The detector 140a converts incident light into an electrical signal capable of being measured by the measuring circuitry 144a. Light output from the splitter 138a and incident to the detector 140a may pass through a medium, such as air, a waveguide, or other suitable medium.

Like the detector 140a, the detector 152a may comprise an optical detector for detecting optical signals. For example, the detector 152a includes one or more photodiodes (e.g., an array of photodiodes) or other photosensors (e.g., phototransistors, avalanche diodes, and/or the like) that detect light received from the communication network 108. The detector 152a converts incident light into an electrical signal and passes the electrical signal to the amplification circuitry 156a. Compared to the detector 140a, the detector 152a may be a higher performance optical detector (e.g., capable of higher speed detection) because detector 152a is involved in detecting data signals from transmitter Tx2 during normal operation of the system 100 while output of the detector 140a may be less important or ignored during normal operation.

The amplification circuitry 156a may comprise circuitry for amplifying the electrical signals output from the detector 152a to ensure the processing circuitry 132a receives the electrical signals with sufficient amplitude. A specific, but non-limiting, example of the amplification circuitry 156a is one or more transimpedance amplifiers (TIAs). Additionally or alternatively, other suitable amplification circuitry may also be employed.

As shown in FIG. 2, the transceiver 120 includes the same or similar elements as the transceiver 116. For example, the transceiver 120 includes the transmitter Tx2, the receiver Rx2 and processing circuitry 132b. Although the processing circuitry 132b is shown as being separate from the transmitter Tx2 and receiver Rx2, it should be appreciated that the processing circuitry 132b may be included in the transmitter Tx2 and/or the receiver Rx2 if desired.

The transmitter Tx2 of the transceiver 120 includes a light source 124b, a driver 128b, a modulator 136b, a splitter 138b, and a detector 140b, while the receiver Rx2 of the transceiver 120 may include a detector 152b and amplification circuitry 156b.

The light source 124b may include a light emitting device, such as a diode laser or an array of diode lasers, for generating optical signals. In an embodiment according to FIG. 2, the light source 124b may emit continuous (i.e., not varying) light, and light modulation may carried out by the modulator 136b. The modulator 136b may be a Mach-Zender modulator (MZM), a Franz-Keldysh modulator, a micro-ring modulator, or the like. Alternatively, the processing circuitry 132b may directly control the light source 124b to emit modulated light without using the modulator 136b.

The driver 128b may include appropriate driving circuitry for driving the modulator 136b under control of the processing circuitry 132b to output a driving signal DRVb having a particular voltage swing (e.g., a desired peak-to-peak voltage) and a particular bias voltage applied to electrodes of the modulator 136b. The driver 128b may include amplification circuitry so that the driving signal DRVb is an amplified signal.

The processing circuitry 132b may comprise software, hardware, or a combination thereof. For example, the processing circuitry 132b may include a memory including executable instructions and a processor (e.g., a microprocessor or microcontroller) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 132b may comprise hardware, such as an application specific integrated circuit (ASIC). Other non-limiting examples of the processing circuitry 132b include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 132b may be provided on a Printed Circuit Board (PCB) or collection of PCBs. It should be appreciated that any appropriate type of electrical component or collection of electrical components may be suitable for inclusion in the processing circuitry 132b. The processing circuitry 132b may send and/or receive signals to and/or from other elements of the transceiver 120 to control overall operation of the transceiver 120.

In an embodiment according to FIG. 2, the processing circuitry 132b includes measuring circuitry 144b and a microcontroller (uC) 148b. The measuring circuitry 144b may include hardware and/or software for measuring one or more characteristics of output from the detector 140b. For example, the measuring circuitry 144b may include a signal power meter that senses optical power of the signal input to the detector 140b. The microcontroller 148b has processing capabilities and may include memory that stores a look-up-table (LUT). The LUT and functions of the processing circuitry 132b will be described in more detail below with reference to FIGS. 3A-6.

The splitter 138b may include a beam splitter that directs a first portion of modulated light output from the modulator 140b toward the detector 140b and directs a second portion of the modulated light output from the modulator 140b through an output of the transmitter Tx1 to the communication network 108. For example, the splitter 138b may comprise a prism or multiple prisms to direct light in the manner described above. In at least one embodiment the splitter 138b is constructed to direct about 10% of light output from the modulator 136b to the detector 140b and direct remaining light (about 90%) to the output of the transmitter Tx1 connected to the communication network 108. However, example embodiments are not limited thereto and the amount of light directed by the splitter 138b may be adjusted according to design preferences.

The detector 140b may include an optical detector for detecting an optical signal. For example, the detector 140b includes one or more photodiodes (e.g., an array of photodiodes) or other photosensors (e.g., phototransistors, avalanche diodes, and/or the like) that detect light output from the splitter 138b. The detector 140b converts incident light into an electrical signal capable of being measured by the measuring circuitry 144b. Light output from the splitter 138b and incident to the detector 140b may pass through a medium, such as air, a waveguide, or other suitable medium.

Like the detector 140b, the detector 152b may comprise an optical detector for detecting optical signals. For example, the detector 152b includes one or more photodiodes (e.g., an array of photodiodes) or other photosensors (e.g., phototransistors, avalanche diodes, and/or the like) that detect light received from the communication network 108. The detector 152b converts incident light into an electrical signal and passes the electrical signal to the amplification circuitry 156b. Compared to the detector 140b, the detector 152b may be a higher performance optical detector (e.g., capable of higher speed detection) because detector 152b is involved in detecting data signals from transmitter Tx1 during normal operation of the system 100 while output of the detector 140b may be less important or ignored during normal operation.

The amplification circuitry 156b may comprise circuitry for amplifying the electrical signals output from the detector 152b to ensure the processing circuitry 132b receives the electrical signals with sufficient amplitude. A specific, but non-limiting, example of the amplification circuitry 156b is one or more transimpedance amplifiers (TIAs). Additionally or alternatively, other suitable amplification circuitry may also be employed.

Example embodiments propose schemes for adaptive transmission performance optimization of an electro-optic transceiver module 116 and/or 120 by adjusting the driving conditions or characteristics of transmitters Tx1 and/or Tx2. The optimization mechanism relies on performance metrics and measurements acquired from transmitter and receiver subsystems of a transceiver (e.g., transceiver 116 and/or transceiver 120). This approach allows for optimization of power consumption and link margins (in terms of SNR, optical power) of a point-to-point connection. The power consumption metric is directly correlated to the driving power of the electronic driving IC of the electro-optical modulator. One embodiment employs a Mach-Zehnder Modulator (MZM)-based optical transmitter (see FIGS. 3A and 3B), but example embodiments may be applied to various externally modulated transmitters (EMLs, Ring modulators) or directly modulated optical transmitters (VCSEL or DMLs).

As discussed in more detail below, example embodiments propose to optimize and/or improve electro-optical links of the system 100 by operating each transmitter Tx1 and Tx2 with different sets of driving conditions to transmit known signals (e.g., training signals or training sequences) that produce different sets of performance metrics. For example, an electro-optical link includes transmitter Tx1-communication network 108—receiver Rx2, and another electro-optical link includes transmitter Tx2-communication network 108—receiver Rx1. These links may be optimized in terms of performance metrics (e.g., bit error rate (BER), jitter, signal-to-noise ratio (SNR), RSSI and/or the like) based on the tuning of driving conditions of the transmitters Tx1 and Tx2. Tuning of these driving conditions depends on the characteristics the electro-optical components included in the transceiver modules 116 and 120 as well as losses over the link. The characteristics of each transceiver's components may differ from the nominal values specified during manufacturing, which may lead to transmission inefficiencies.

Figure 3A:
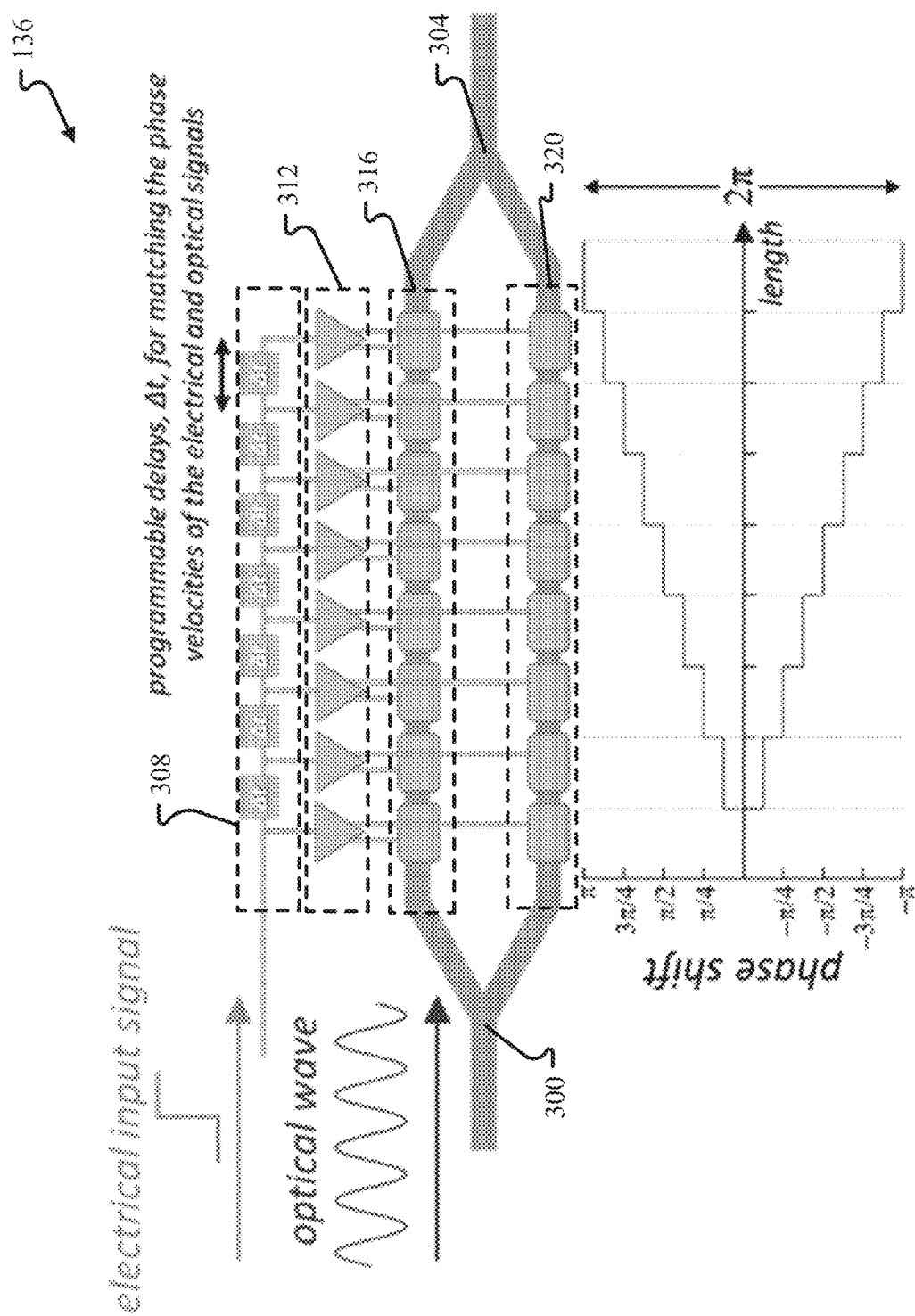
FIG. 3A illustrates an example structure of a modulator according to at least one example embodiment.

FIG. 3A illustrates an example structure of a modulator 136, which may be applied to modulators 136a and/or 136b. In particular, FIG. 3A illustrates a modulator with an MZM structure. As shown, the MZM structure includes an input 300 an output 304, a plurality of delay elements 308, a plurality of drivers 312, a first plurality of electrodes 316, and a second plurality of electrodes 320. In one embodiment, the delay elements 308 and the drivers 312 are part of the driver 128. In operation, an electrical input signal (e.g., a data signal) is input to the modulator 136 from processing circuitry 132 and/or driver 128 while an optical wave (e.g., a constant optical wave) is input to the modulator 136 from a light source 124. The optical wave is split into two beams so that one beam travels along the top branch of the modulator 136 and one beam travels along the bottom branch of the modulator 136. In accordance with MZM-based techniques, the electrodes 316 and/or 320 apply voltage to the upper and/or lower branches of the modulator 136 in accordance with the electrical input signal applied to modulate the light passing through each branch. Thereafter, the light is recombined at the output 304 to form an optical signal that is modulated with the electrical input signal (e.g., the optical signal at output 304 is modulated with data).

The delay elements 308 may be programmable and include circuitry that delays input of the electrical signal to the drivers 312 to assist with matching phase velocities of the electrical input signal and the optical wave. As shown, each pair of corresponding electrodes that are vertically aligned is associated with a different phase shift that ranges from $-\pi$ to $\pi$.

FIG. 3B illustrates transfer functions for the modulator 136 of FIG. 3A for NRZ modulation and PAM4 modulation. In FIG. 3B, the operating point OP (or quadrature point) of the modulator 136 and voltage swing of driver signal DRV are the same for NRZ and PAM4 modulation at $V\pi/2$ and $V\pi$, respectively. The output for each case ideally has a maximum extinction ratio (ER) that approaches infinity and a maximum optical modulation amplitude (OMA).

As discussed in more detail below, driving conditions of the transmitters Tx1 and Tx2 may refer to optical power of an optical signal output from the light sources 124a and 124b and/or may be related to the modulation transfer functions of the modulators 136a and 136b. For example, as shown in FIG. 3B, the modulator 136 should be operated at an operating point OP, which may be tuned by adjusting the bias voltage applied to the modulator 136, where the bias voltage is applied to electrodes 316 and/or 320 (e.g., the bias voltage is the voltage across an electrode 316 and an opposing electrode 320). The voltage swing of the driving signal DRV (e.g., driving signal DRVa or DRVb) around the operating point OP determines the optical modulation of the modulated signal, as well as other signal integrity parameters (e.g., level imbalance or linearity in the case of PAM-4). The optimum values for modulator bias voltage and voltage swing that achieve the best possible performance at a receiver are related to the intrinsic characteristics of the modulator 136 (e.g., mismatches between components of the modulator as designed and as manufactured), the optical link between the modulator 136 and a corresponding receiver, and the performance of the corresponding receiver.

As discussed in more detail below, inventive concepts propose to improve or optimize performance of the transceiver 116 and/or the transceiver 120 by, in an initialization stage, applying different sets driving conditions to the transmitters of each transceiver and using two kinds of training signals and two kinds of feedback to determine performance metrics achieved with each set of driving conditions. Then, in a data transmission stage of a transmitter Tx1 or Tx2, one of these sets of driving conditions may be selected based on the performance metrics and employed for transmitting data across the communication network 108.

In general, inventive concepts include three stages for optimizing the system 100: an initialization stage, a link setup stage, and a data transmission stage. Each of these stages is addressed in more detail below.

Figure 4A:
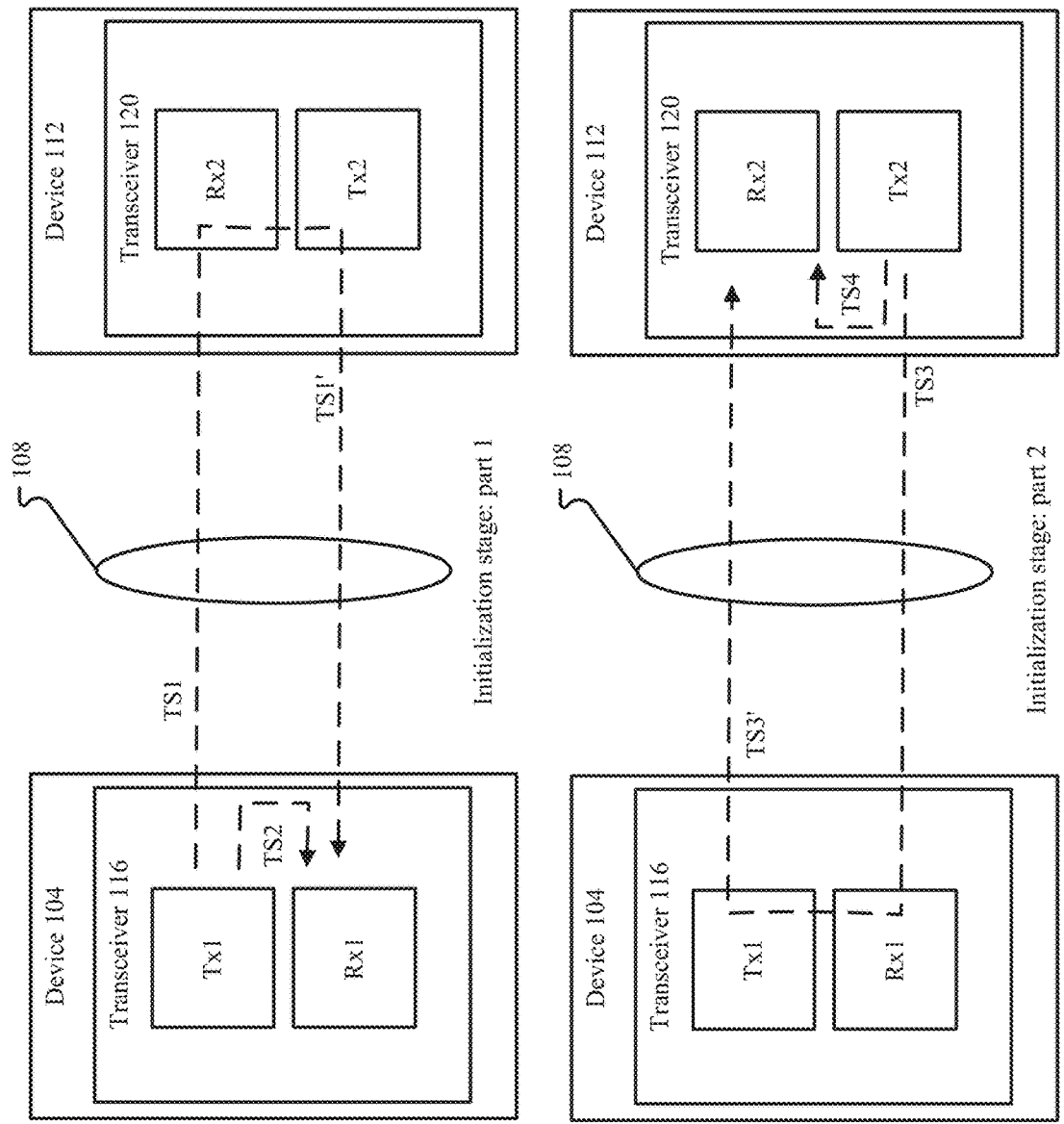
FIG. 4A shows general block diagrams for a two-part initialization stage according to at least one example embodiment.

FIG. 4A shows general block diagrams for a two-part initialization stage according to at least one example embodiment. In part 1 of the initialization stage, the transmitter Tx1 (operating with selected settings regarding modulator voltage swing and bias voltage conditions) generates a training signal TS1. The training signal TS1 may include a training sequence having properties (e.g., sequence length, power, and/or the like) that properly capture the effects of the channel (e.g., a fiber channel) that connects transceivers 116 and 120. For example, the training signal TS1 is transmitted across the communication network 108 to receiver Rx2 of transceiver 120. Transceiver 120, after receiving and decoding the training signal TS1 received by receiver Rx2 to recover data of TS1 and without performing any post-detection functions (e.g., error correction or a similar function), feeds the recovered data as an input to transmitter Tx2. The transmitter Tx2 (operating with selected settings regarding modulator voltage swing and bias voltage conditions) transmits a training signal TS1' to receiver Rx1. Training signal TS1' is a version of training signal TS1 that is based on the recovered data from TS1. Receiver Rx1 detects the training signal TS1', and the transceiver 116 acquires signal characteristics from the detected signal. One such signal characteristic may include Receiver Signal Strength Indicator—RSSI. Other signal characteristics include BER, jitter, SNR, optical channel impairments (e.g., noise and/or distortion of the received signal TS1' caused by dispersion or Kerr (non-linear) effects), and/or the like. These signal characteristics may define performance metrics for the optical link between the transmitter Tx1 and transceiver 120.

Part 1 of the initialization stage also includes the transmitter Tx1 generating and transmitting a training signal TS2. As discussed in more detail below with reference to FIG. 4B, training signal TS2 travels a self-feedback path that is contained within the device 104 and/or the transceiver 116. The training signal TS2 may be generated and transmitted in a distinctly separate time period compared to training signal TS1. In addition, the training signal TS2 may include a training sequence having properties (e.g., sequence length, power, etc.) that are suited for determining information about the modulator 136a. Such information may include information about linearity of the modulator 136a, information about level imbalance of the modulator 136a, and/or information that assists with determining an operating point OP of the modulator 136a. In the context of the instant description, linearity of a modulator may refer to the linearity of the optical power Pout of signals output from the modulator compared to input signals. For example, a modulator may operate linearly when Pout=A*Ein with A being a constant in units of W/V and Ein being the electrical input signal from a driver. On the other hand, the modulator may operate non-linearly when Pout A*Ein. In the context of the instant description, imbalance of a modulator may refer to the scenario where the phase shifts induced by two opposing electrodes 316 and 320 on the optical wave from a light source are not equal. Modulator imbalance may occur due to variances introduced during manufacturing and may degrade the symmetry of driving signals applied to the electrodes of the modulator.

As discussed below, part 2 of the initialization stage works in reverse compared to part 1.

In part 2 of the initialization stage, the transmitter Tx2 (operating with selected settings regarding modulator voltage swing and bias voltage conditions) generates a training signal TS3. The training signal TS3 may include a training sequence having properties (e.g., sequence length, power, etc.) that properly capture the effects of the fiber channel that connects transceivers 120 and 116. The training signal TS3 generated by transmitter Tx2 may be substantially the same as or different from the training signal TS1 generated by the transmitter Tx1. The training signal TS3 is transmitted across the communication network 108 to receiver Rx1 of transceiver 116. Transceiver 116, after receiving and decoding the training signal TS3 received by receiver Rx1 to recover data from TS3 and without performing any post-detection functions (e.g., error correction or a similar function), feeds the recovered data as an input to transmitter Tx1. The transmitter Tx1 (operating with selected settings regarding modulator voltage swing and bias voltage conditions) transmits a training signal TS3' to receiver Rx1. Training signal TS3' is a version of training signal TS3 that is based on the recovered data from TS3. Receiver Rx2 detects the training signal TS3', and the transceiver 120 acquires signal characteristics from the detected signal. One such signal characteristic may include Receiver Signal Strength Indicator—RSSI. Other signal characteristics include BER, jitter, SNR, optical channel impairments (e.g., noise and/or distortion of the received signal TS1' caused by dispersion or Kerr (non-linear) effects), and/or the like. These signal characteristics may define performance metrics of the optical link between transmitter Tx2 and transceiver 116.

Part 2 of the initialization stage also includes the transmitter Tx2 generating and transmitting a training signal TS4. As discussed in more detail below with reference to FIG. 4C, training signal TS4 travels a self-feedback path that is contained within the device 112 and/or the transceiver 120. The training signal TS4 may be generated and transmitted in a distinctly separate time period compared to training signal TS3. The training signal TS4 may be the substantially the same as or different from training signal TS2. The training signal TS4 may include a training sequence having properties (e.g., sequence length, power, etc.) that are suited for determining information about the modulator 136b. Such information may include information about linearity of the modulator 136b, information about level imbalance of the modulator 136b, and/or information that assists with determining an operating point OP of the modulator 136b.

As discussed in more detail below, each part of the initialization stage plays a role in creating an LUT that matches driving conditions of each transmitter Tx1 and Tx2 to performance metrics of the modulators 136a and 136b and the links between transmitter Tx1 and receiver Rx2 and between transmitter Tx2 and receiver Rx1.

Figure 4B:
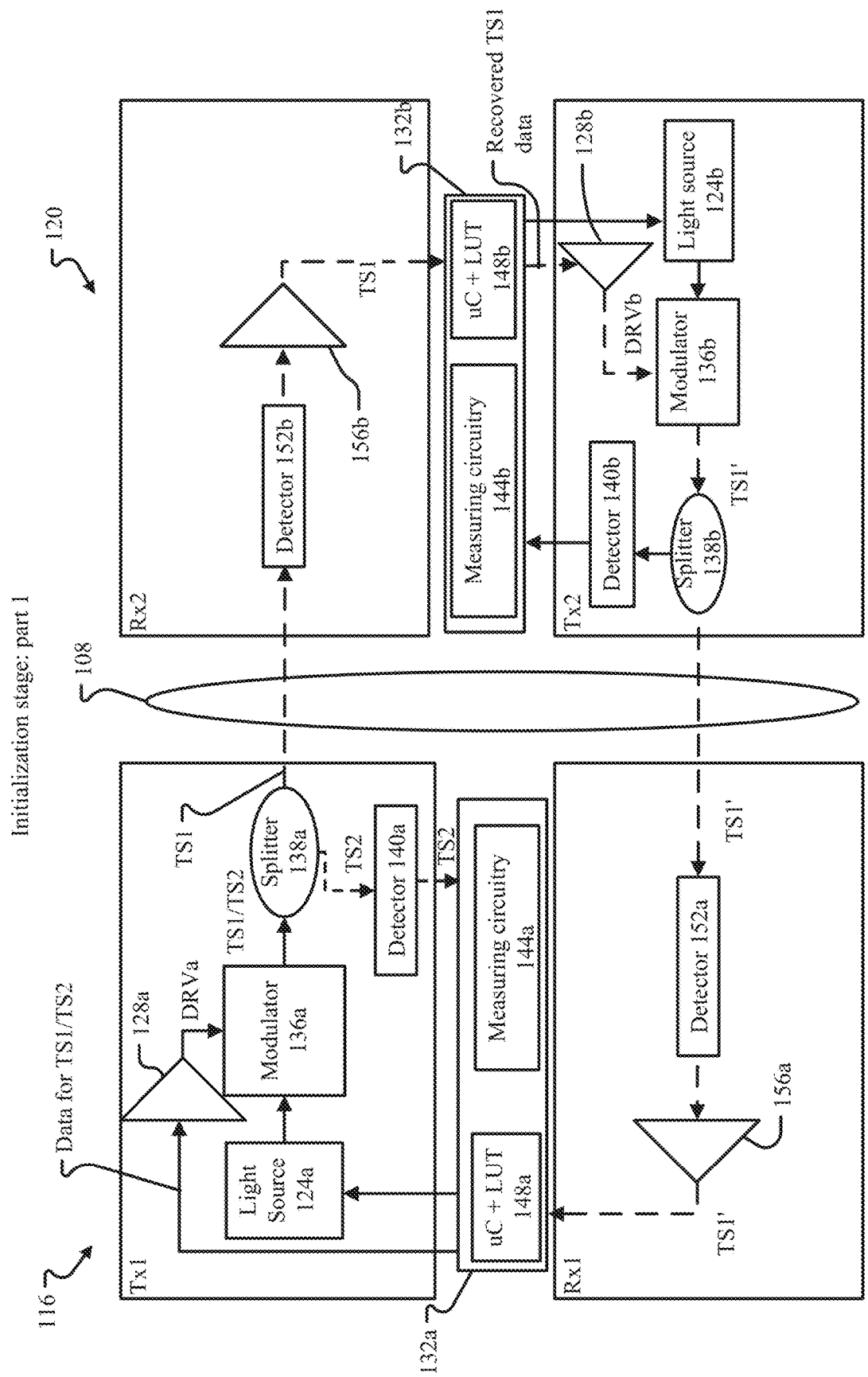
FIG. 4B illustrates part 1 of the initialization stage from FIG. 4A in more detail according to at least one example embodiment.

FIG. 4B illustrates part 1 of the initialization stage from FIG. 4A in more detail.

As shown in FIG. 4B, the processing circuitry 132a sends signals including data or training sequences for training signals TS1 and TS2 to the driver 128a. As noted above, training signal TS1 is generated and transmitted separately from training signal TS2.

With reference to generation and transmission of training signal TS1, the driver 128a and/or the light source 124a are driven according to known driving conditions to cause the modulator 136a to output the training signal TS1 which includes a training sequence suitable for capturing information about the channel between transceivers 116 and 120. The known driving conditions may be related to optical power of light output from the light source 124a and/or be related to a modulation transfer function of the modulator 136a. As discussed above, driving conditions related to the modulation transfer function may include bias voltage and voltage swing conditions of the modulator 136a.

The splitter 138a is positioned in the signal path of training signal TS1 output from the modulator 136a and splits the training signal TS1 into two signals. However, the signal of interest for part 1 of the initialization stage is the signal that travels over the communication network 108 because training signal TS1 is constructed to capture information about the channel between transceivers 116 and 120. As noted above, the splitter 138a may direct a majority of the training signal TS1 (e.g., about 90% of TS1) to the communication network 108 through an output of the transmitter Tx1.

The training signal TS1 may undergo various transformations as the signal travels to and through transceiver 120. For example, the training signal TS1 travels through the communication network 108 and is detected by the detector 152b and amplified by the amplification circuitry 156b. The processing circuitry 132b may recover the training sequence (or training data) from the training signal TS1 based on output of the amplification circuitry 156b. Thereafter, and without performing post-data recovery functions like error correction, the processing circuitry 132b feeds the recovered data as input to the transmitter Tx2. For example, the processing circuitry 132b drives the driver 128b based on the recovered data to output driving signal DRVb. Thereafter, light from the light source 124b and the driving signal DRVb cause the modulator 136b to output a training signal TS1'. The training signal TS1' may be split into first and second portions by splitter 138b in the same or similar manner as the splitter 138a splits the training signal TS1. However, the portion of TS1' that travels back over the communication network 108 is the signal of interest.

As shown, the training signal TS1' travels over the communication network 108 and is detected by detector 152a, amplified by amplification circuitry 156a, and input to the processing circuitry 132a. Based on this input, the processing circuitry 132a determines one or more signal characteristics of the training signal TS1' (e.g., signal power, SNR, jitter, BER, RSSI, and/or the like) as received by the receiver Rx1.

Part 1 of the initialization stage further includes transmitter Tx1 generating and transmitting training signal TS2. For example, the driver 128a and/or the light source 124a are driven according to known driving conditions to cause the modulator 136a to output the training signal TS2 which includes a training sequence suitable for capturing information about the modulator 136a. The known driving conditions may include a known optical power of light output from the light source 124a and/or known conditions of a modulation transfer function of the modulator 136a. As discussed above, driving conditions related to the modulation transfer function may include bias voltage and voltage swing conditions of the modulator 136a.

The training signal TS2 is split by the splitter 138a in the same manner as that discussed above for training signal TS1. However, the portion of the training signal TS2 that is directed to the detector 140a is the signal of interest and this portion of the training signal TS2 is detected by the detector 140a. Output of the detector 140a is passed to the processing circuitry 132a in the form of a detection signal (which may be an electrical signal). The processing circuitry 132a, with the aid of measuring circuitry 144a and/or the microprocessor 148a, determines one or more characteristics of the training signal TS2. For example, the measuring circuitry 144a includes a power meter that measures optical power of the training signal TS2 based on the detection signal received from detector 140a. As may be appreciated from FIG. 4B, the signal path of interest for TS2 is completely contained within the transceiver 116 and may be referred to as self-feedback for the transceiver 116. Determining the optical power of the training signal TS2 may be useful for determining the operating point OP of the modulator 136a, the imbalance of the modulator 136a, and/or the linearity of the modulator 136a.

In view of the description of FIGS. 4A and 4B, it should be appreciated that the processing circuitry 132a now possesses information on the training signals TS1 and TS2 as generated by the processing circuitry 132a with known driving conditions for the modulator 136a, information on the training signal TS1 as detected through the feedback loop that includes transceiver 120, and information on the training signal TS2 as detected through the self-feedback loop. As shown in FIG. 5, the processing circuitry 132a may populate this information in an LUT for transmitter Tx1. For example, each row of the LUT for transmitter Tx1 identifies the driving conditions (e.g., modulator bias voltage Bias, modulator voltage swing Swng, optical signal power Pwr of the light source 124a, and/or the like), identifies performance metrics (e.g., SNR, BER, jitter, RSSI, optical channel impairments Ch, and/or the like) achieved with those driving conditions over the link between transceivers 116 and 120 as gathered using training signal TS1, and identifies modulator characteristics (e.g., imbalance, linearity, output optical power OP, and/or the like) achieved with those driving conditions as gathered using training signal TS2. As shown in the LUT for Tx1, part 1 of the initialization stage may be repeated for 'N' different sets driving conditions to generate 'N' different sets of performance metrics.

Figure 4C:
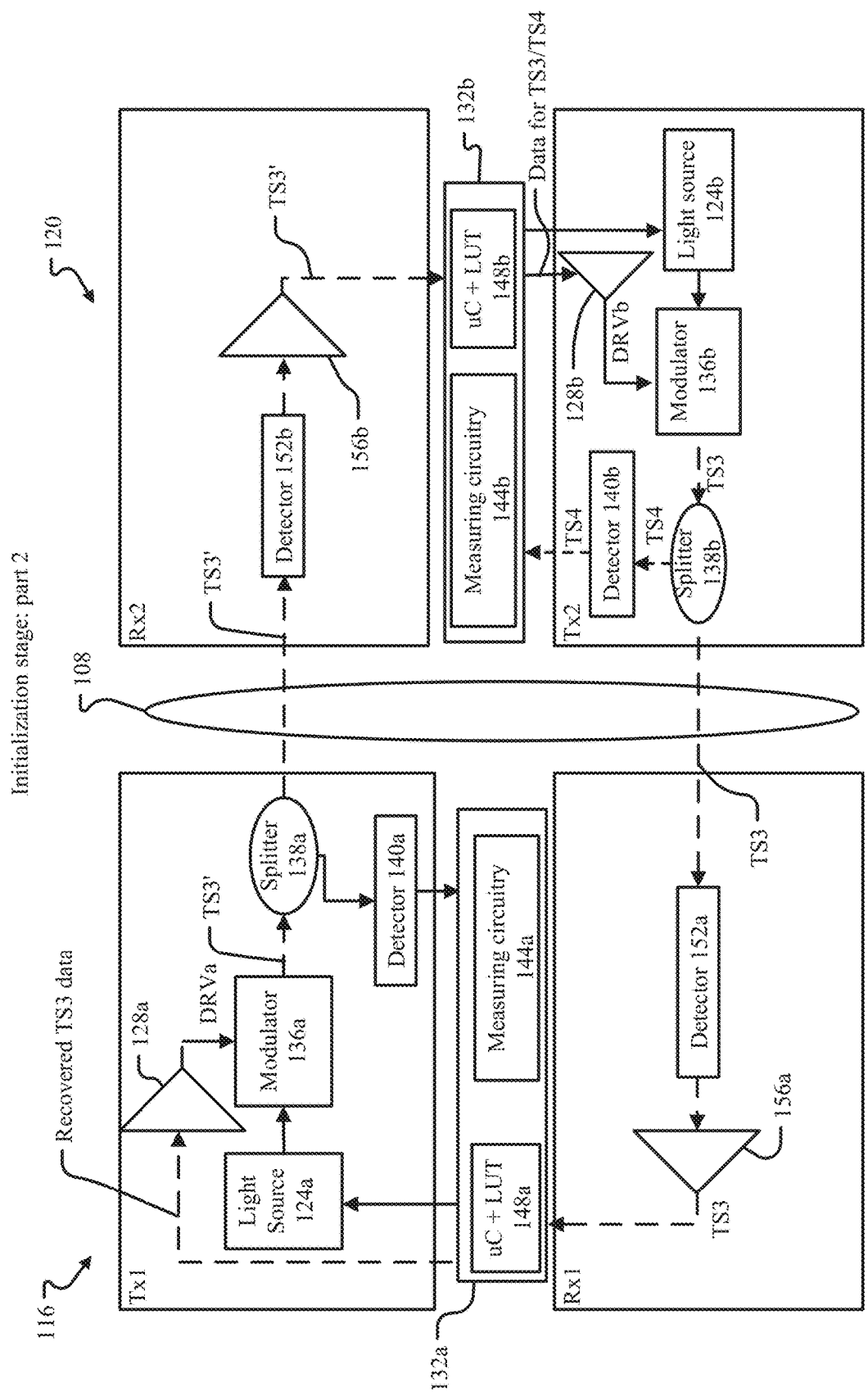
FIG. 4C illustrates part 2 of the initialization stage from FIG. 4A in more detail according to at least one example embodiment.

With reference to FIG. 4C, part 2 of the initialization stage includes performing the operations described with reference to FIG. 4B in reverse. In other words, part 2 of the initialization stage creates an LUT for transmitter Tx2 of transceiver 120 using training signals TS3 and TS4.

As shown in FIG. 4C, the processing circuitry 132b sends signals including data or training sequences for training signals TS3 and TS4 to the driver 128b. As noted above, training signal TS3 is generated and transmitted separately from training signal TS4.

With reference to generation and transmission of training signal TS3, the driver 128b and/or the light source 124b are driven according to known driving conditions to cause the modulator 136b to output the training signal TS3 which includes a training sequence suitable for capturing information about the channel between transceivers 120 and 116. The known driving conditions may be related to optical power of light output from the light source 124b and/or be related to a modulation transfer function of the modulator 136b. As discussed above, driving conditions related to the modulation transfer function may include bias voltage and voltage swing conditions of the modulator 136b.

The splitter 138b is positioned in the signal path of training signal TS1 output from the modulator 136b and splits the training signal TS3 into two signals. However, the signal of interest for part 2 of the initialization stage is the signal that travels over the communication network 108 because training signal TS3 is constructed to capture information about the channel between transceivers 120 and 116. As noted above, the splitter 138*b* may direct a majority of the training signal TS3 (e.g., about 90% of TS3) to the communication network 108 through the output of transmitter Tx2.

The training signal TS3 may undergo various transformations as the signal travels to and through transceiver 116. For example, the training signal TS3 travels through the communication network 108 and is detected by the detector 152*a* and amplified by the amplification circuitry 156*a*. The processing circuitry 132*a* may recover the training sequence (or data) from the training signal TS3 based on output of the amplification circuitry 156*a*. Thereafter, and without performing post-data recovery functions like error correction, the processing circuitry 132*a* feeds the recovered data as input to the transmitter Tx1. For example, the processing circuitry 132*a* drives the driver 128*a* based on the recovered data to output driving signal DRVa. Thereafter, light from the light source 124*a* and the driving signal DRVa cause the modulator 136*a* to output a training signal TS3'. The training signal TS3' may be split into first and second portions by splitter 138*a* in the same or similar manner as the splitter 138*b* splits the training signal TS3. However, the portion of TS3' that travels back over the communication network 108 is the signal of interest.

As shown, the training signal TS3' travels over the communication network 108 and is detected by detector 152*b*, amplified by amplification circuitry 156*b*, and input to the processing circuitry 132*b*. Based on this input, the processing circuitry 132*b* determines one or more signal characteristics of the training signal TS3' (e.g., signal power, SNR, jitter, BER, RSSI and/or the like) as received by the receiver Rx2. These signal characteristics may characterize the optical link between the transmitter Tx2 and transceiver 116.

Part 2 of the initialization stage further includes transmitter Tx2 generating and transmitting training signal TS4. For example, the driver 128*b* and/or the light source 124*b* are driven according to known driving conditions to cause the modulator 136*b* to output the training signal TS4 which includes a training sequence suitable for capturing information about the modulator 136*b*. The known driving conditions may include a known optical power of light output from the light source 124*b* and/or known conditions of a modulation transfer function of the modulator 136*b*. As discussed above, driving conditions related to the modulation transfer function may include bias voltage and voltage swing conditions of the modulator 136*b*.

The training signal TS4 is split by the splitter 138*b* in the same manner as that discussed above for training signal TS3. However, the portion of the training signal TS4 that is directed to the detector 140*b* is the signal of interest and this portion of the training signal TS4 is detected by the detector 140*b*. Output of the detector 140*b* is passed to the processing circuitry 132*b* in the form of a detection signal (which may be an electrical signal). The processing circuitry 132*b*, with the aid of measuring circuitry 144*b* and/or the microprocessor 148*b*, determines one or more characteristics of the training signal TS4. For example, the measuring circuitry 144*b* includes a power meter that measures optical power of the training signal TS4 based on the detection signal received from detector 140*b*. As may be appreciated from FIG. 4C, the signal path of interest for TS4 is completely contained within the transceiver 120 and may be referred to as self-feedback for the transceiver 120. Determining the optical power of the training signal TS4 may be useful for determining the operating point OP of the modulator 136*b*, the imbalance of the modulator 136*b*, and/or the linearity of the modulator 136*b*.

In view of the description of FIGS. 4A and 4C, it should be appreciated that the processing circuitry 132*b* now possesses information on the training signals TS3 and TS4 as generated by the processing circuitry 132*b* with known driving conditions for the modulator 136*b*, information on the training signal TS3 as detected through the feedback loop that includes transceiver 116, and information on the training signal TS4 as detected through the self-feedback loop. As shown in FIG. 5, the processing circuitry 132*b* may populate this information in an LUT for transmitter Tx2. For example, each row of the LUT identifies the driving conditions (modulator bias Bias, modulator driver swing Swng, optical signal power Pwr of the light source 124*b*, and/or the like), identifies performance metrics (e.g., SNR, BER, jitter, RSSI, optical channel impairments Ch, and/or the like) achieved with those driving conditions over the link between transceivers 120 and 116 as gathered using training signal TS3, and identifies modulator characteristics (e.g., linearity, imbalance, measured output optical power OP, and/or the like) achieved with those driving conditions as gathered using training signal TS4. As shown in the LUT, part 2 of the initialization stage may be repeated for 'N' different sets driving conditions to generate 'N' different sets of performance metrics.

Upon completion of the initialization stage that forms LUTs in FIG. 5 for each transceiver 116 and 120, both transceivers 116 and 120 have concluded the mapping of driver conditions (e.g., modulator voltage swing and modulator bias voltage) to the link performance and the modulator performance. Inventive concepts may then enter the link setup stage by consulting the tables in FIG. 5, for example. As may be appreciated, the performance metrics in the LUT for Tx1 in FIG. 5 characterize the link between the transmitter Tx1 and the transceiver 120 using information gathered with training signal 1, and the modulator characteristics characterize the modulator 136*a* using information gathered with training signal 2. Likewise, the performance metrics in the LUT for Tx2 in FIG. 5 characterize the link between the transmitter Tx2 and the transceiver 116 using information gathered with training signal TS3, and the modulator characteristics characterize the modulator 136*b* using information gathered with training signal TS4.

Each transceiver 116 and 120 sets its driving conditions to selected values (e.g., optimum values) based on the LUTs in FIG. 5. For example, the processing circuitry 132*a* accesses the LUT for transmitter Tx1 and determines which set of driving conditions produced the best performance metrics (e.g., minimum BER, minimum jitter, maximum SNR, maximum RSSI, maximum modulator linearity, and/or the like). If more than one set of driving conditions correspond to the best transmission metrics, then the set of driving conditions with a minimum driving swing may selected to minimize the power consumption of the transmitter Tx1. Transceiver 120 carries out the same or similar selection process for driving conditions by the processing circuitry 132*b* accessing the LUT for transmitter Tx2.

Upon selecting appropriate sets of driving conditions for each transceiver 116 and 120, the system 100 can operate in a data transmission stage where the transceiver 116 and/or the transceiver 120 transmit data. During operation, the initialization and link setup stages may be periodically repeated in order to identify whether the transceivers 116 and 120 are operating with desired or optimum conditions and reduced or minimum power consumption settings. In other words, the LUT entries may correlate the current state of the transceivers 116 and 120 to the performance of the link. If the link performance deteriorates (e.g., increased optical losses) and the processing circuitry 132a and/or 132b cannot correlate current performance metrics with the performance metrics in the LUTs, the initialization stage and setup stage described above may be repeated.

In view of the above, it should be appreciated that an initialization stage according to inventive concepts associates sets of driving conditions with corresponding sets of performance metrics that are achieved with the sets of driving conditions. Each association between a set of driving conditions and a corresponding set of performance metrics is stored as an entry in the LUTs. Thereafter, the system 100 may receive or otherwise be notified of one or more data transmission metrics associated with transmitting data, select an appropriate set driving conditions based on the data transmission metrics, and apply the selected set of driving conditions for transmitting the data. The above- and below-described optimization process enables the system 100 to account for mismatches between the components of the system 100 as designed and components of the system 100 as manufactured and implemented.

Figure 6:
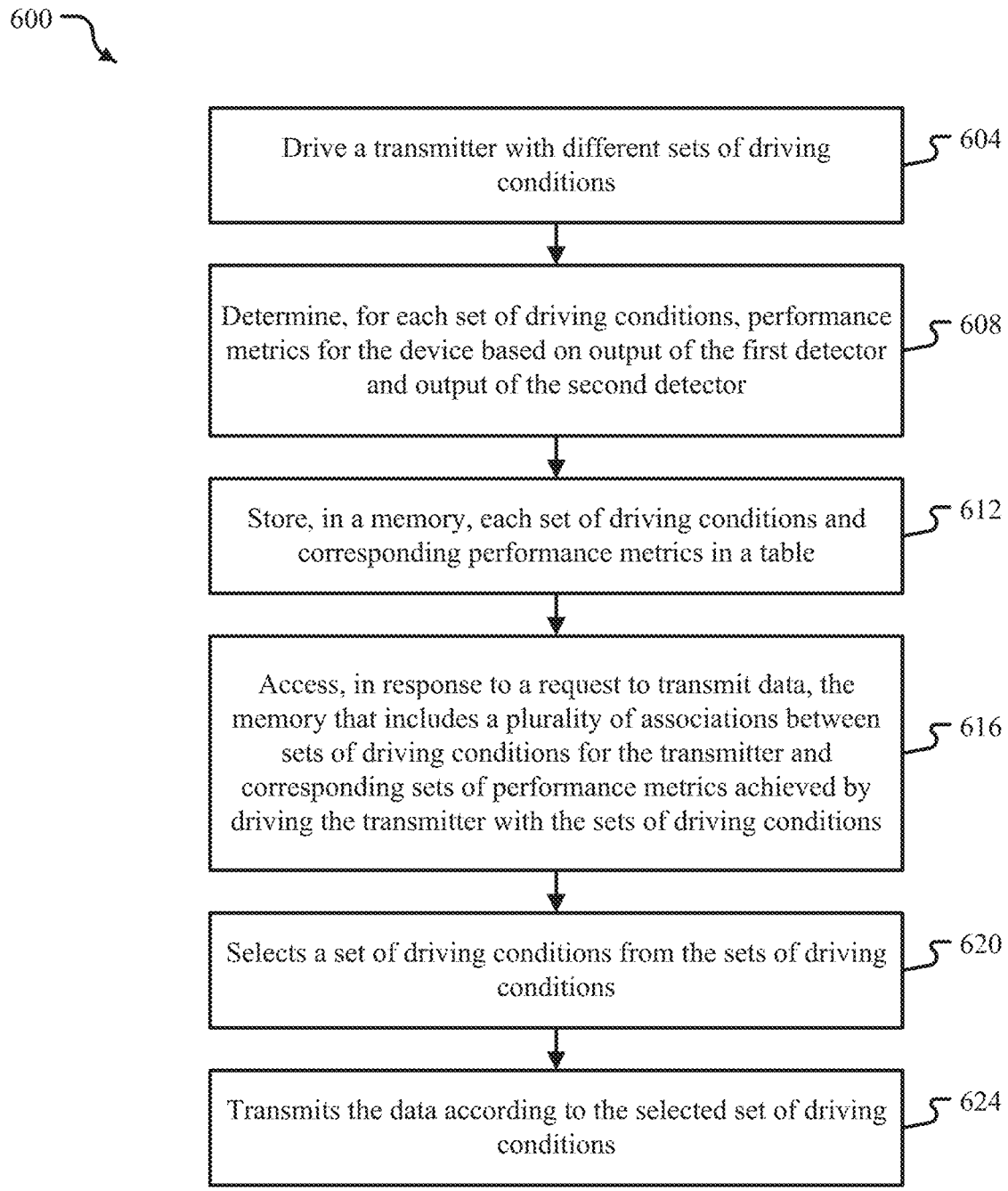
FIG. 6 illustrates a flowchart for a method according to at least one example embodiment.

FIG. 6 illustrates a flowchart for a method 600 according to at least one example embodiment. The method 600 is described with reference to elements of the transceiver 116 but the description equally applies to the same elements of the transceiver 120.

While a general order for the steps of the method 600 is shown in FIG. 6, the method 600 can include more or fewer steps or can arrange the order of the steps differently than those shown in FIG. 6. The method 600 may be executed by the processing circuitry 132a and/or the processing circuitry 132b. Additionally or alternatively, the operations discussed with respect to FIG. 6 may be implemented other elements of the system(s) described with reference to FIGS. 1-5. The method 600 may be explained with general reference to the systems, components, assemblies, devices, user interfaces, environments, software, etc. described in conjunction with FIGS. 1-5.

Operation 604 includes driving a transmitter with different sets of driving conditions. For example, the transmitter Tx1 of transceiver 116 is driven with different sets of driving conditions as explained above with reference to FIGS. 4A and 4B. As noted above, each set of driving conditions may include optical power of the light source 124a, and a bias voltage applied to electrodes of the modulator 136a and a voltage swing of a driving signal DRVa applied to the modulator 136a.

Operation 608 includes determining, for each set of driving conditions, corresponding performance metrics of the transmitter based on output of the first detector 140a and based on output of the second detector 152b. The performance metrics may include signal characteristics such as SNR, BER, jitter, RSSI, channel impairments, and/or the like as well as modulator characteristics of the modulator 136a such as modulator linearity, modulator operating point, and modulator imbalance.

Operation 612 includes storing the sets of driving conditions and the corresponding performance metrics for each set of driving conditions. For example, the sets of driving conditions and the corresponding performance metrics for each set of driving conditions are stored as associations on a memory of the processing circuitry 132a in table format as depicted in FIG. 5. Here, it should be understood that each association refers to a row in the table of FIG. 5 because that row identifies performance metrics and modulator characteristics that are determined by driving the transmitter Tx1 with the set of driving conditions in the same row.

Operation 616 includes accessing the memory that includes the plurality of associations between sets of driving conditions for the transmitter and corresponding sets of performance metrics achieved by driving the transmitter with the sets of driving conditions. Operation 616 may occur in response to a request for the transmitter Tx1 to transmit data to transceiver 120.

Operation 620 includes selecting a set of driving conditions from the stored sets of driving conditions. For example, the set of driving conditions is selected based on the performance metrics and/or based on data transmission metrics. For example, in the absence of data transmission metrics that specifically indicate that one or more performance metrics in the table are more important than other performance metrics, operation 620 selects the set of driving conditions that achieves the best performance metrics. The best performance metrics may be defined as the set of performance metrics in the table of FIG. 5 that has the most desired minimum and/or maximum performance metric values. Consider an example for first and second driving conditions that each have an associated set of performance metrics that include BER, SNR, and jitter. Assume that the first driving conditions achieve a lower BER and a higher SNR than the second driving conditions and that the second driving conditions achieve a lower jitter than the first driving conditions. In this case, operation 620 selects the first driving conditions because two out of the three categories of the corresponding performance metrics achieve better performance compared to one out of three categories for performance metrics achieved with the second driving conditions.

In at least one embodiment, the set of driving conditions for each transmitter Tx1 and Tx2 is selected in operation 620 based on data transmission metrics that indicate desired performance metrics for transmitting data. For example, the data transmission metrics may indicate that a low BER is more important than other performance metrics. Thus, the transmitter Tx1 may select the set of driving conditions that minimize BER even if that set of driving conditions results in more jitter or reduced SNR compared to other sets of driving conditions. The data transmission metrics may be based on empirical evidence and/or user preference.

Operation 624 includes causing the transmitter to transmit data according to the selected set of driving conditions. For example, the processing circuitry 132a applies the bias voltage and voltage swing (and any other driving conditions) as indicated by within the table of FIG. 5 to the modulator 136a (e.g., with driving signal DRVa) to transmit data to transceiver 120.

With the link now transmitting data in normal operation, the measurements described in the initialization stages of FIGS. 4A to 4C may be periodically repeated in order to identify whether the link is operating at its optimum conditions and minimum power consumption settings. In other words, the LUT entries can correlate the current state of the transceivers A and B and the performance of the link. In case the link performance deteriorates (e.g., increased optical losses) and the microcontroller cannot correlate the measurements with the performance metrics in the LUT entries, new initialization stages may be triggered.

The method 600 has been described with respect to operations performed at transceiver 116. However, the method 600 may equally be applied to transceiver 120.

In view of the above it should be appreciated that example embodiments are directed to a device comprising a transmitter Tx1, a first detector 152a, a second detector 140a, and processing circuitry 132a. The processing circuitry 132a drives the transmitter Tx1 with different sets of driving conditions, determines, for each set of driving conditions, corresponding performance metrics of the transmitter Tx1 based on output of the first detector 152a and based on output of the second detector 140a. The performance metrics may include BER, jitter, SNR, RSSI, linearity of modulator 136a, imbalance of modulator 136a, operating point of the modulator 136a, and/or the like.

The processing circuitry 132a stores the sets of driving conditions and the corresponding performance metrics for each set of driving conditions, for example, in a table as in FIG. 5. The processing circuitry 132a selects a set of driving conditions from the stored sets of driving conditions based on data transmission metrics and causes the transmitter Tx1 to transmit data according to the selected set of driving conditions.

In at least one embodiment, the transmitter Tx1 includes a modulator 136a, and each set of driving conditions includes a bias voltage and a voltage swing applied to the modulator 136a. The output of the first detector 152a is based on a training signal TS1 that travels a first signal path, and the output of the second detector 140a is based on a training signal TS2 that travels a second signal path different from the first signal path. As shown in FIG. 4B, first signal path and the second signal path partially overlap, for example, between the output of the modulator 136a and the splitter 138a. The device may include the splitter 138a positioned in the first signal path and the second signal path and that splits the training signal TS1 and the training signal TS2. As further shown in FIG. 4B, first signal path for TS1 is partially external to the device 104, and the second signal path for TS2 is confined within the device 104.

With reference to FIG. 5, the sets of driving conditions and the corresponding performance metrics for each set of driving conditions are stored in a table (e.g., the LUT for Tx1), and the selected set of driving conditions is selected from the table. Here, it should be appreciated that the performance metrics include first metrics determined based on the output of the first detector 152a, second metrics determined based on the output of the second detector 140a. As shown in FIG. 5, the first metrics relate to performance of the transmitter Tx1 over an optical link to an external receiver Rx2, and the second metrics relate to performance of the modulator.

Still with reference to FIGS. 1-6, at least one example embodiment is directed to a device 104 processing circuitry 132a configured to drive a modulator 136a of a transmitter Tx1 with a first driving signal to cause the modulator 136a to output a first optical signal TS1. The processing circuitry 132a is determines one or more signal characteristics of the first optical signal (e.g., BER, SNR, jitter, RSSI, etc.) that characterize performance metrics of a link between the transmitter Tx1 and a receiver Rx2. The processing circuitry 132a drives the modulator 136a of the transmitter Tx1 with a second driving signal to cause the modulator 136a to output a second optical signal TS2. The processing circuitry 132a determines one or more modulator characteristics of the modulator 136a (e.g., modulator linearity, imbalance, operating point, and/or the like) based on the second optical signal. The processing circuitry 132a stores an association between the performance metrics, the one or more modulator characteristics, and driving conditions used to drive the modulator 136a with the first driving signal and the second driving signal.

As may be appreciated from FIG. 4B, the processing circuitry 132a includes a first input that receives a first detection signal from a detector 152a, and a second input that receives the second detection signal from a detector 140a. The first detection signal is generated based on detection of the first optical signal TS1 by the detector 152a, and the second detection signal is generated based on detection of the second optical signal TS2 by the detector 140a.

In one embodiment, the first driving signal modulates the first optical signal TS1 with a first training sequence, and the second driving signal modulates the second optical signal TS2 with a second training sequence different from the first training sequence.

As discussed with reference to FIG. 4B, the processing circuitry 132a is configured to extract the first training sequence TS1 (or TS1' in FIG. 4B) from the first detection signal and determine the one or more signal characteristics based on the first training sequence extracted from the first detection signal. The first training sequence is extracted at least once by an external device (e.g., by processing circuitry 132b) before extraction by the processing circuitry 132a.

In one embodiment, the first driving signal causes the modulator 136a to output the first optical signal TS1 according to a pulse amplitude modulation 4-level (PAM4) scheme.

At least one example embodiment is directed to a device comprising a transmitter and processing circuitry 132a that accesses, in response to a request to transmit data, a memory including stored associations that associate sets of driving conditions for the transmitter with corresponding sets of performance metrics achieved by driving the transmitter with the sets of driving conditions, selects a set of driving conditions from the sets of driving conditions based on data transmission metrics, causes the transmitter Tx1 to transmit the data according to the selected set of driving conditions.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

It should be appreciated that inventive concepts cover any embodiment in combination with any one or more other embodiment, any one or more of the features disclosed herein, any one or more of the features as substantially disclosed herein, any one or more of the features as substantially disclosed herein in combination with any one or more other features as substantially disclosed herein, any one of the aspects/features/embodiments in combination with any one or more other aspects/features/embodiments, use of any one or more of the embodiments or features as disclosed herein. It is to be appreciated that any feature described herein can be claimed in combination with any other feature(s) as described herein, regardless of whether the features come from the same described embodiment.

Example embodiments may be configured as follows:

(1) A transceiver, comprising:
 a transmitter including:
 a light source;
 a modulator coupled to the light source;
 a driver that drives the modulator according to a set of driving conditions to cause the modulator to output optical signals based on light from the light source; and
 an output that passes first portions of the optical signals output by the modulator;
 a first detector that detects second portions of the optical signals output from the modulator; and
 a receiver including:
 a second detector that detects optical signals from an external transmitter.

(2) The transceiver of (1), further comprising:
 a splitter positioned in an optical path of the optical signals output from the modulator.

(3) The transceiver of one or more of (1) to (2), wherein the splitter splits the optical signals output from the modulator into the first portions and the second portions.

(4) The transceiver of one or more of (1) to (3), wherein the splitter directs less than 50% of each optical signal output from the modulator to the first detector and directs a remainder of each optical signal output from the modulator to the output of the transmitter.

(5) The transceiver of one or more of (1) to (4), further comprising:
 a measuring device that measures optical power of the second portions of the optical signals output from the modulator based on output of the first detector.

(6) The transceiver of one or more of (1) to (5), further comprising:
 processing circuitry that selects the set of driving conditions from sets of stored driving conditions.

(7) The transceiver of one or more of (1) to (6), wherein the sets of stored driving conditions are generated during an initialization stage of the transceiver that determines performance metrics of the transmitter for each set of driving conditions based on output of the first detector and output of the second detector.

(8) The transceiver of one or more of (1) to (7), wherein the optical signals output from the modulator are modulated according to a pulse amplitude modulation 4-level (PAM4) scheme.

(9) A device, comprising:
 a transmitter;
 a first detector;
 a second detector; and
 processing circuitry that:
 drives the transmitter with different sets of driving conditions;
 determines, for each set of driving conditions, corresponding performance metrics of the transmitter based on output of the first detector and based on output of the second detector;
 stores the sets of driving conditions and the corresponding performance metrics for each set of driving conditions;
 selects a set of driving conditions from the stored sets of driving conditions based on data transmission metrics; and
 causes the transmitter to transmit data according to the selected set of driving conditions.

(10) The device of (9), wherein the transmitter includes a modulator, and wherein each set of driving conditions includes a bias voltage and a voltage swing applied to the modulator.

(11) The device of one or more of (9) to (10), wherein the output of the first detector is based on a first training signal that travels a first signal path.

(12) The device of one or more of (9) to (11), wherein the output of the second detector is based on a second training signal that travels a second signal path different from the first signal path.

(13) The device of one or more of (9) to (12), wherein the first signal path and the second signal path partially overlap.

(14) The device of one or more of (9) to (13), further comprising:
 a splitter positioned in the first signal path and the second signal path and that splits the first training signal and the second training signal.

(15) The device of one or more of (9) to (14), wherein the second signal path is confined within the device.

(16) The device of one or more of (9) to (15), wherein the first signal path is partially external to the device.

(17) The device of one or more of (9) to (16), wherein the sets of driving conditions and the corresponding performance metrics for each set of driving conditions are stored in a table, wherein the selected set of driving conditions is selected from the table.

(18) The device of one or more of (9) to (17), wherein, for each set of driving conditions, the corresponding performance metrics include:
 first metrics determined based on the output of the first detector; and
 second metrics determined based on the output of the second detector.

(19) The device of one or more of (9) to (18), wherein the first metrics relate to performance of the transmitter over an optical link to an external receiver, and wherein the second metrics relate to relate performance of the modulator.

(20) A device, comprising:
 a transmitter; and
 processing circuitry that:
 accesses, in response to a request to transmit data, a memory including stored associations that associate sets of driving conditions for the transmitter with corresponding sets of performance metrics achieved by driving the transmitter with the sets of driving conditions;
 selects a set of driving conditions from the sets of driving conditions based on data transmission metrics; and
 causes the transmitter to transmit the data according to the selected set of driving conditions.

What is claimed is:

1. A transceiver, comprising:
 a transmitter including:
 a light source;
 a modulator coupled to the light source;
 a driver that drives the modulator according to a set of driving conditions to cause the modulator to output optical signals based on light from the light source; and
 an output that passes first portions of the optical signals output by the modulator;
 a first detector that detects second portions of the optical signals output from the modulator;
 a receiver including:
 a second detector that detects optical signals from an external transmitter; and
 processing circuitry that:
 generates optical training signals for output by the transmitter;

determines, based on versions of the optical training signals returned to the receiver after being processed by an external receiver and the external transmitter, sets of performance metrics achieved by driving the transmitter with different sets of driving conditions;

stores the sets of driving conditions and the sets of performance metrics; and selects the set of driving conditions from the stored sets driving conditions.

2. The transceiver of claim 1, further comprising:

a splitter positioned in an optical path of the optical signals output from the modulator.

3. The transceiver of claim 2, wherein the splitter splits the optical signals output from the modulator into the first portions and the second portions.

4. The transceiver of claim 3, wherein the splitter directs less than 50% of each optical signal output from the modulator to the first detector and directs a remainder of each optical signal output from the modulator to the output of the transmitter.

5. The transceiver of claim 1, further comprising:

measuring circuitry that measures optical power of the second portions of the optical signals output from the modulator based on output of the first detector.

6. The transceiver of claim 1, wherein the optical training signals returned to the receiver are detected by the second detector.

7. The transceiver of claim 1, wherein the sets of stored driving conditions are generated during an initialization stage of the transceiver that determines performance metrics of the transmitter for each set of driving conditions based on output of the first detector and output of the second detector.

8. The transceiver of claim 1, wherein the optical signals output from the modulator are modulated according to a pulse amplitude modulation 4-level (PAM4) scheme.

9. A device, comprising:

a transmitter;

a first detector;

a second detector;

a splitter; and processing circuitry that:

drives the transmitter with different sets of driving conditions;

determines, for each set of driving conditions, corresponding performance metrics of the transmitter based on output of the first detector and based on output of the second detector;

stores the sets of driving conditions and the corresponding performance metrics for each set of driving conditions;

selects a set of driving conditions from the stored sets of driving conditions based on data transmission metrics; and causes the transmitter to transmit data according to the selected set of driving conditions, wherein the output of the first detector is based on a first training signal that travels a first signal path, wherein the output of the second detector is based on a second training signal that travels a second signal path different from the first signal path, wherein the first signal path and the second signal path partially overlap, and wherein the splitter is positioned in the overlap between the first signal path and the second signal path and outputs the first training signal along a remainder of the first signal path and the second training signal along a remainder of the second signal path.

10. The device of claim 9, wherein the transmitter includes a modulator.

11. The device of claim 10, wherein each set of driving conditions includes a bias voltage and a voltage swing applied to the modulator.

12. The device of claim 10, wherein the transmitter further comprises a driver that drives the modulator.

13. The device of claim 10, wherein, for each set of driving conditions, the corresponding performance metrics include:

first metrics determined based on the output of the first detector; and second metrics determined based on the output of the second detector.

14. The device of claim 13, wherein the first metrics relate to performance of the transmitter over an optical link to an external receiver, and wherein the second metrics relate to relate performance of the modulator.

15. The device of claim 9, wherein the first signal path and the second signal path overlap within the transmitter.

16. The device of claim 9, wherein the splitter directs less than 50% of a signal input to the splitter to the first detector as the second training signal.

17. The device of claim 9, wherein the remainder of the second signal path is confined within the device.

18. The device of claim 17, wherein at least some of the remainder of the first signal path is external to the device.

19. The device of claim 9, wherein the sets of driving conditions and the corresponding performance metrics for each set of driving conditions are stored in a table, wherein the selected set of driving conditions is selected from the table.

20. A device, comprising:

a transmitter; and processing circuitry that:

generates optical training signals for output by the transmitter;

determines, based on versions of the optical training signals returned to a receiver associated with the transmitter after being processed by an external receiver and an external transmitter, sets of performance metrics achieved by driving the transmitter with different sets of driving conditions;

stores the sets of driving conditions and the sets of performance metrics in memory;

accesses, in response to a request to transmit data, the memory;

selects a set of driving conditions from the sets of driving conditions stored in the memory based on data transmission metrics; and causes the transmitter to transmit the data according to the selected set of driving conditions.

* * * * *